(12) United States Patent
Van Den Berg

(10) Patent No.: US 8,717,222 B2
(45) Date of Patent: May 6, 2014

(54) METHOD AND APPARATUS FOR MONITORING THE SURFACES OF SLAG AND MOLTEN METAL IN A MOULD

(75) Inventor: Frenk Dimitri Van Den Berg, Amsterdam (NL)

(73) Assignee: Tata Steel Ijmuiden B.V., Ijmuiden (NL)

( * ) Notice: Subject to any disclaimer, the term of this patent is extended or adjusted under 35 U.S.C. 154(b) by 482 days.

(21) Appl. No.: 12/812,918

(22) PCT Filed: Jan. 12, 2009

(86) PCT No.: PCT/EP2009/000118
§ 371 (c)(1),
(2), (4) Date: Jan. 24, 2011

(87) PCT Pub. No.: WO2009/090025
PCT Pub. Date: Jul. 23, 2009

(65) Prior Publication Data
US 2011/0109496 A1 May 12, 2011

(30) Foreign Application Priority Data

Jan. 18, 2008 (EP) ..................... 08100646

(51) Int. Cl.
*G01S 13/00* (2006.01)
(52) U.S. Cl.
USPC ............................................ 342/22; 342/124
(58) Field of Classification Search
USPC .................................. 342/22, 124
See application file for complete search history.

(56) References Cited

U.S. PATENT DOCUMENTS

| | | | |
|---|---|---|---|
| 4,458,530 A | | 7/1984 | Bastida |
| 5,105,874 A | * | 4/1992 | Krausener et al. ............ 164/451 |
| 5,115,242 A | * | 5/1992 | Nagamune et al. ........... 342/124 |
| 5,629,706 A | * | 5/1997 | Bååth ............................ 342/124 |
| 6,130,637 A | | 10/2000 | Meszaros et al. |
| 6,166,681 A | * | 12/2000 | Meszaros et al. ............. 342/124 |
| 6,255,983 B1 | * | 7/2001 | Meszaros et al. ............. 342/124 |
| 2002/0154053 A1 | * | 10/2002 | Schiek et al. ................. 342/124 |
| 2003/0098815 A1 | * | 5/2003 | Teshirogi et al. ............. 343/772 |
| 2004/0212529 A1 | | 10/2004 | Fehrenbach et al. |
| 2007/0109177 A1 | * | 5/2007 | Baath et al. ................... 342/124 |

FOREIGN PATENT DOCUMENTS

| | | |
|---|---|---|
| EP | 0 060 597 A2 | 9/1982 |
| EP | 0 172 394 A1 | 2/1986 |
| EP | 1 619 754 A1 | 1/2006 |
| EP | 1619754 A1 | 1/2006 |
| JP | 54-158195 A | 12/1979 |
| JP | 58090130 A * | 5/1983 |
| JP | 10-80762 A | 3/1998 |
| JP | 2000254770 A * | 9/2000 |
| JP | 2003-050227 A | 2/2003 |
| JP | 2005-034886 A | 2/2005 |
| JP | 2005034886 A * | 2/2005 |
| JP | 2005-233783 A | 9/2005 |
| JP | 2007-127639 A | 5/2007 |

(Continued)

*Primary Examiner* — Timothy A Brainard
(74) *Attorney, Agent, or Firm* — Novak Druce Connolly Bove + Quigg LLP

(57) ABSTRACT

A method for monitoring the surfaces of slag and molten metal in a mold of a continuous casting apparatus, using radar equipment is disclosed. The radar equipment emits a beam of electromagnetic waves having a bandwidth of at least 20 GHz. This also relates to an apparatus for using the method.

29 Claims, 2 Drawing Sheets

(56) References Cited

FOREIGN PATENT DOCUMENTS

Figure 1:
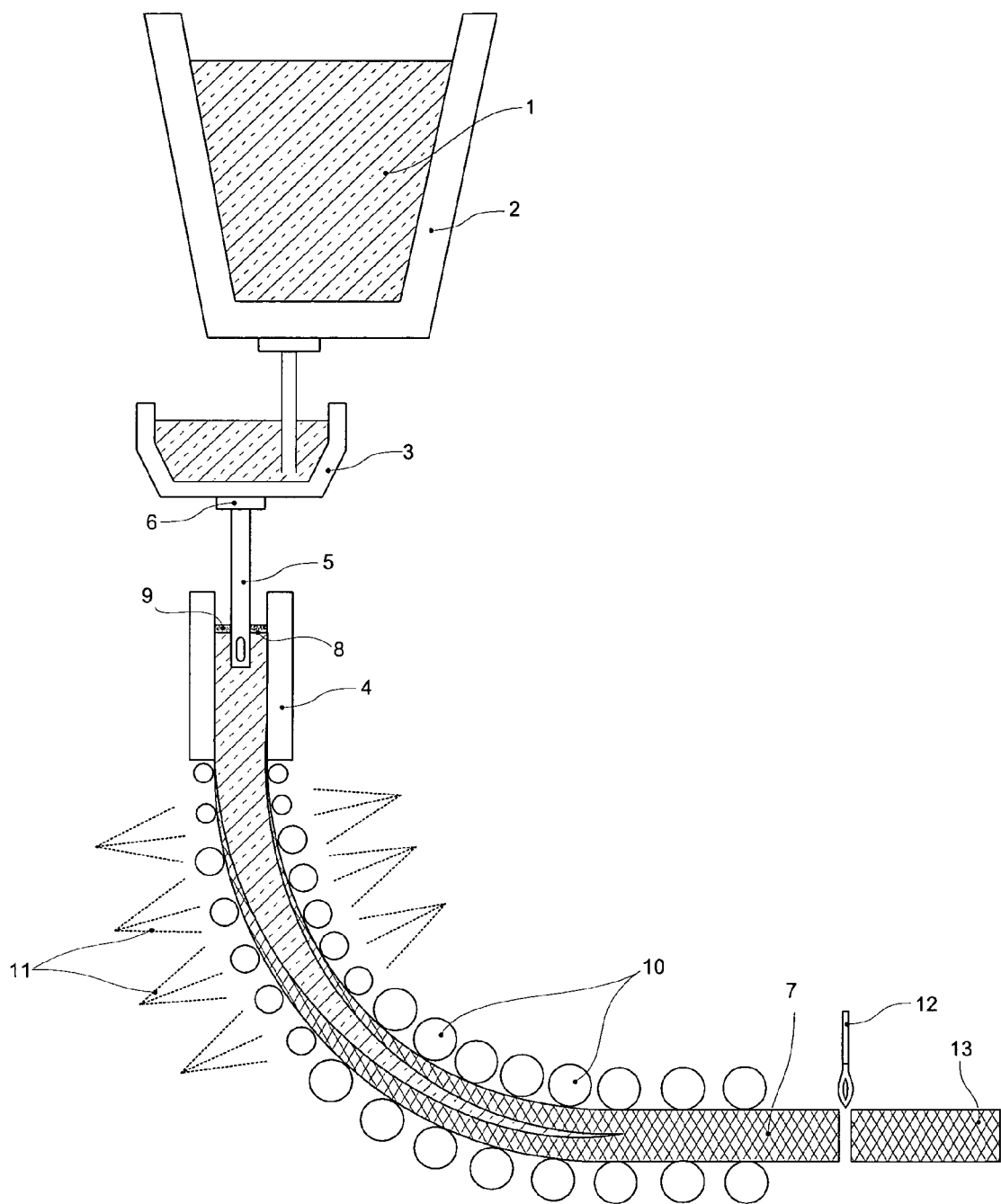

| WO | 94/18549 A1 | 8/1994 |
| WO | 96/36449 A1 | 11/1996 |
| WO | 2005/037461 A1 | 4/2005 |
| WO | 2005/062846 A2 | 7/2005 |

\* cited by examiner

METHOD AND APPARATUS FOR MONITORING THE SURFACES OF SLAG AND MOLTEN METAL IN A MOULD

CROSS-REFERENCE TO RELATED APPLICATION

This application is a §371 National Stage Application of International Application No. PCT/EP2009/000118, filed on 12 Jan. 2009, claiming the priority of European Patent Application No. 08100646.2 filed on 18 Jan. 2008.

The invention relates to a method and apparatus for monitoring the surfaces of slag and molten metal in a mould of a continuous casting apparatus, using radar equipment.

Methods for monitoring the surface of molten metal so as to control the level of the molten metal are known. Usually, the known methods use an emitter of electromagnetic waves, such as radio waves, microwaves or radar waves, which waves are reflected so as to measure the level of the molten metal in the metallurgical apparatus, and sometimes also the thickness of the slag layer.

WO 2005/062846 describes the use of microwaves to monitor the level, volume, or weight of the molten metal in a tundish during use. The reflections of the microwave radiation are analysed to determine the level of the steel and to detect a microwave pattern indicative of vortex formation in the tundish. This method is especially used to prevent slag from mixing with the molten metal when the level of the molten metal in the tundish becomes low.

JP 10080762 relates to the continuous measurement of molten steel and slag in a ladle using microwaves to prevent slag from flowing out. The turbulence of the outflow of steel is measured.

EP 0 172 394 A1 also relates to the measurement of steel in a tundish to prevent slag from mixing with the steel in a continuous casting apparatus. A radar system is used to measure the thickness of the slag layer and to control the thickness of the slag layer, which is performed by combining it with the measuring of the weight of the tundish to determine the level of the steel. No indication is given what type of radar system is needed.

WO 94/18549 describes a method for simultaneously measuring the positions of more than one surface in metallurgical processes in metallurgical vessels, such as converters, ladles and electric arc furnaces. In these vessels, it is preferred that both the surface of the slag and the interface between the slag and the liquid metal are measured. This document states that by using a low frequency IF-signal obtained by a FMCW radar system (Frequency Modulated Continuous Wave radar system) only a single surface can be detected. IF-signals are known to be formed by a FMCW radar system between the reflected beam and the transmitted beam. WO 94/18549 proposes that a radio signal having a circular polarisation is transmitted towards the metallurgical vessel, and that in this way the distances to both surfaces can be measured. A drawback of this method is however that not the absolute distance is known, but a distance plus or minus one or more periodicities determined by the circularity of the polarisation.

WO 96/36449 describes a method for continuous casting, in which molten steel and liquid synthetic slag are supplied to a mould through tubes extending through a cover over the mould, the cover being present so as to flush the space between the cover and the surface of the slag layer with a protective gas. The positions of the surface of the molten steel and the surface of the slag are continuously measured by means of a radiation based measuring device such as a radar system, to control the supply of steel and slag so as to keep the surfaces of the steel and the slag on predetermined levels in the mould. No specifications are given for the radiation based measurement device; reference is made to WO 94/18549 which relates to circularly polarised radio signals.

None of the above documents describes a method that is directly suitable to use in the mould of a continuous casting machine, especially so since according to the present practice the slag is not supplied in liquid form, but as slag powder, and no cover is needed over the mould.

It is an object of the present invention to provide a method for monitoring the surfaces of slag and molten metal in a mould of a continuous casting apparatus in which a shallow layer of slag is present.

It is a further object of the invention to provide a method for monitoring the surfaces of slag and molten metal in a mould of a continuous casting apparatus, using radar equipment, with which it is possible to accurately measure the height of the surface of the molten metal and the slag in the mould.

It is another object of the invention to provide a method for monitoring the surfaces of slag and molten metal in a mould of a continuous casting apparatus, using radar equipment, that is suitable to measure the profile of the surface of the molten metal and the slag layer in the mould.

It is also an object of the invention to provide an improved apparatus for monitoring the surfaces of slag and molten metal in a mould of a continuous casting apparatus, using radar equipment. Moreover, it should also be possible to use this apparatus in a tundish or ladle.

According to the invention, one or more of these objects can be reached by using a method for monitoring the surfaces of slag and molten metal in a mould of a continuous casting apparatus, using radar equipment, wherein the radar equipment emits a beam of electromagnetic waves having a bandwidth of at least 20 GHz.

By using radar equipment that emits electromagnetic waves over a bandwidth of at least 20 GHz, producing a sweeping frequency signal for monitoring the surfaces of slag and molten metal in the mould of a continuous casting apparatus, it is possible to distinguish the surface of the molten metal and the surface of the slag layer, contrary to the finding in WO 94/18549, which slag layer in the mould of a continuous casting apparatus has a thickness of approximately 3 to 5 cm. It has been found that radar equipment using a beam of electromagnetic waves having a bandwidth of less than 20 GHz cannot distinguish between the surfaces when the slag layer is that shallow, especially since the slag layer itself has a varying substance from liquid on the molten metal to powder on top of the layer, but that radar equipment having a bandwidth of more than 20 GHz can distinguish such thicknesses of the slag.

Preferably, the radar equipment emits a beam of electromagnetic waves having a bandwidth of at least 30 GHz. By using a bandwidth of at least 30 GHz, it is also possible to distinguish the slag and the molten metal surface when the slag layer is thinner than the usual thickness of 3 to 5 cm, because it is expected that the layer thickness of the slag can vary over the surface of the molten metal. By using a bandwidth of at least 30 GHz thus also thinner slag layers can be measured.

According to a preferred embodiment, the beam forms a frequency modulated continuous wave or quasi-stepped frequency modulated wave. This type of wave makes it possible to use relatively simple, state of the art equipment based on radio equipment to detect and register the frequency modulated wave.

Preferably, the radar equipment has been positioned to the side of the mould and the beam of electromagnetic waves is directed towards the slag and molten metal in the mould using a deflection device, such as a mirror. To be able to measure the metal and slag surface in the mould, the beam should be directed almost perpendicularly to these surfaces, since the mould of a thin slab caster internally has a width of only approximately 10 cm and a length of approximately 200 cm, and the surface of the molten metal can be quite some distance below the edge of the mould. By using a reflection device the radar equipment does not have to be placed above the mould, where little space is available due to the tundish above and where the temperature is high, but the radar equipment can be placed to the side of the mould where more space is available and where the temperature will be lower, and where it is easier to handle and maintain the radar equipment. Only the deflection device now has to be placed above the mould.

According to a preferred embodiment, the radar equipment uses a leaky lens antenna preferably having an opening angle of 30 degrees or less for emitting the beam of electromagnetic waves. Such leaky lens antennae are known, for instance from EP 1619754 A1. With this type of antennae a highly directed beam can be produced, having a wide bandwidth.

Preferably, the beam of electromagnetic waves is focussed using a lens. A lens can be used to focus the beam inside the mould. Lenses for focussing radar waves are known in the art.

More preferably, the lens focuses the beam of electromagnetic waves to a spot having a diameter of 3 to 5 cm on the metal surface. With a spot having such a diameter, it is possible to measure the level of the molten metal at a specific place in the mould, and thus not the average level or mean level of the molten metal is measured. Using such a spot, much more detailed information can be gathered about the change in the level of the molten metal.

According to a preferred embodiment, a number of measurements of the level of the molten metal per second is performed, preferably at least ten measurements per second. By performing a number of measurements per second the height of the metal surface can be monitored in time with the required accuracy.

According to another preferred embodiment, the spot is moved over the metal surface so as to form an image of the shape of the metal surface. By being able to move the spot over the metal surface, it is possible to measure the changes in level at different points in the mould.

Preferably, the spot is moved over the metal surface using a rotation of a deflection device. Usually, such a deflection device will already be present so as to be able to position the radar equipment to the side of the mould. Now, the deflection device will be rotated to move the spot over the metal surface.

According to a preferred embodiment, the spot is moved over the metal surface to scan the metal surface and form a number of images of the metal surface per second. In this way, a height profile of the metal surface can be measured, and this several times per second, so the changes in the profile can be followed. This makes it possible to influence the profile of the metal surface, for instance using a magnetic brake.

Preferably the spot is also used to form an image of the slag layer and to measure the thickness of the slag layer. Due to the use of radar equipment as discussed above, it is possible to measure both the level of the molten metal and the level of the slag, and thus the thickness of the slag.

More preferably, the moving spot is also used to scan the surface of the slag layer and to measure the thickness of the slag layer. In this way also the variation in time of the thickness of the slag layer can be measured.

According to a preferred embodiment, the radar equipment is positioned relative to the mould such that the electromagnetic waves travel over a distance between the radar equipment and the steel surface from 0.5 to 5 meter. This distance is optimal to perform accurate, ongoing measurements.

According to a second aspect of the present invention there has been provided an apparatus for monitoring the surfaces of slag and molten metal in a mould, tundish or ladle of a continuous casting apparatus, using radar equipment, wherein the radar equipment emits a beam of electromagnetic waves having a bandwidth of at least 20 GHz. This apparatus can be used for the method as described above.

Further aspects of the apparatus are described in the claims, and the advantages thereof are known from the related aspects of the method described above.

In the above, with radar equipment is especially meant the radar antenna and, where appropriate, the lens. Of course also radar electronics are needed, but usually the electronics are provided at some more distance from the mould (or tundish or ladle).

It will be understood that the above described method and apparatus according to the invention for level measurement and slag thickness measurement in a mould (or tundish or ladle) can also be used for other level and slag thickness measurements in the steel making process, such as in a torpedo ladle, vacuum ladle, tundish or converter.

The invention will be elucidated referring to the attached drawings, wherein:

FIG. 1 schematically shows the casting section of a continuous casting apparatus.

Figure 2:
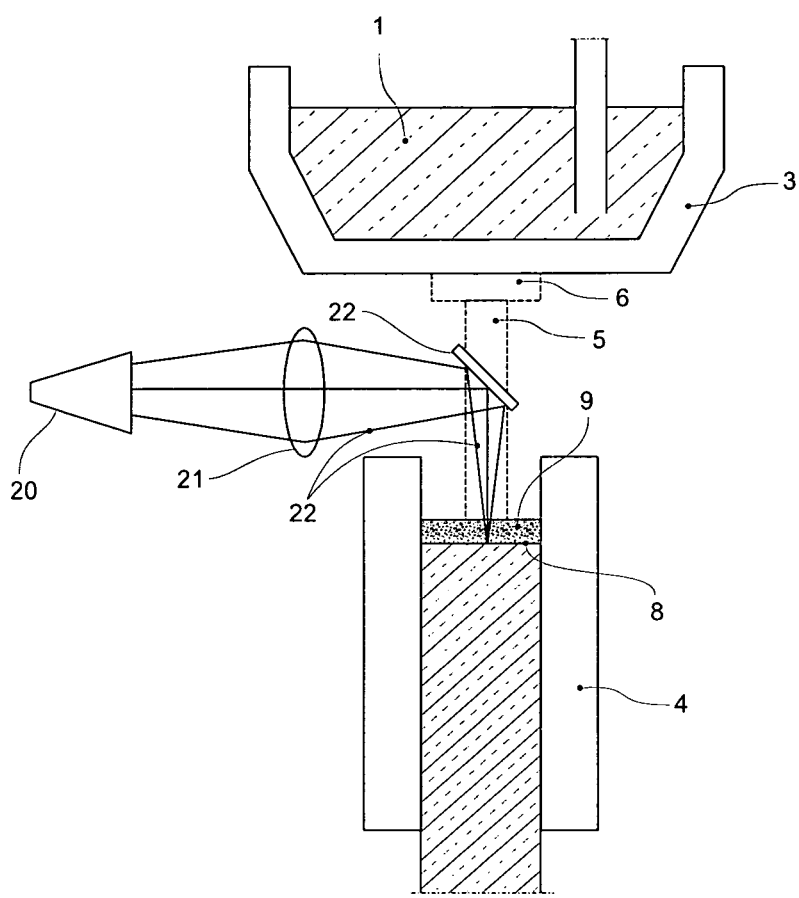

FIG. 2 schematically shows the radar device according to the present invention for use with a mould of a continuous casting apparatus.

FIG. 1 shows a conventional continuous casting apparatus in cross section. Molten steel 1 is supplied in a ladle 2. When a ladle is empty, the empty ladle is removed and replaced by a full ladle. From the ladle, the molten steel is poured into the tundish 3. The tundish should hold enough molten steel to be able to continuously feed the mould while an empty ladle is replaced by a full one. The tundish feeds the mould 4 through a submerged entry nozzle 5, which has to be replaced regularly due to the high thermal load thereof. Usually at least two moulds are present under a tundish. The feeding of the mould is regulated by means of a valve system 6 in the bottom of the tundish.

The molten steel 1 that is fed into the mould 4 is led down through the mould to form a strand 7. In the mould the molten steel forms a meniscus 8 having a substantially constant height in the mould. On the meniscus, mould powder 9 is supplied at for instance four points. The mould is kept in an oscillating upward and downward motion, as a result of which the mould powder is distributed over the meniscus. Due to the heat of the molten steel, the mould powder melts and forms a glassy layer over the meniscus, which feeds a glassy slag film between the molten steel and the wall of the mould. Due to the slag film a solidified steel shell can be formed between the molten steel and the mould, which shell (containing liquid steel) is transported downwards out of the mould, where it is supported by support rolls 10. Here, the shell is cooled by spray water 11 and the liquid pool inside the shell solidifies while the strand is bend towards a horizontal orientation. When the strand is fully solidified, a torch 12 cuts off slabs 13 from the horizontal strand.

FIG. 2 shows the radar device according to the invention with the mould 4 (in cross section) in more detail. The tundish 3 with molten steel 1 and submerged entry nozzle 5 (shown in ghost lines) is present approximately one meter above the mould. Between the tundish and the mould the heat is intense, and there is a possibility that molten steel drops are formed, for instance caused by an exchange of the submerged entry nozzle. For this reason, it is preferred that the sensitive parts of the radar device according to the invention are placed at some distance from the mould, and only a mirror 22 is present between the tundish and the mould. A ceramic shield (not shown) can be present between the mould and the mirror to shield off the mirror.

A radar antenna 20 is placed at a distance of for instance 1 to 3 meters from the mould and is connected to a (electronic) processing unit (not shown) and a power supply (not shown). The radar antenna must emit a beam of electromagnetic waves having a bandwidth of at least 20 GHz, for instance a range of 5-40 GHz. The radar antenna preferably has an opening angle of at most 30 degrees, so for instance an opening angle of 20 degrees. Between the radar antenna and the mirror a lens 21 is placed, to focus the radar beam 23 on the meniscus 8 of the steel in the mould. The radar antenna 20 preferably emits a frequency modulated continuous wave (FMCW), that is (partially) reflected by the meniscus. The frequency difference between the emitted beam and the reflected beam provides a wave having an interference frequency (IF), which can be processed with equipment based on radio equipment. Instead of a FMCW a quasi-stepped frequency modulated wave can be used as well.

Due to the focussed electromagnetic beam, a spot on the meniscus of the molten steel having a diameter of between 3 and 5 cm can be monitored, and the variations in height of the meniscus can be measured. Since the bandwidth of the beam is broad, also the surface of the mould powder 9 can be monitored. Based on this measurement, both the inflow of molten steel 1 from the tundish 3 and the addition of mould powder can be regulated more precisely.

Preferably the mirror 22 above the mould is rotatable. By step-wise rotating the mirror, the beam 23 can be moved over the meniscus 8 of the molten steel and the height variations of the meniscus 8 and the mould layer 9 can be measured along the length of the mould. By pivoting the mirror in a perpendicular direction as well, the meniscus can be monitored over its full surface.

It is also possible to rotate the mirror continuously so a to form an image of the shape of the meniscus of the molten steel, preferably within a short time span. By doing so with a certain frequency, for instance at least 10 times a second, the movement of the meniscus can be monitored, and the effects of for instance the inflow of molten steel from the tundish can be measured. This opens possibilities for regulating the flow of the molten steel inside the mould. This can for instance be done with a magnetic brake; such brakes are known in the art.

The invention claimed is:

1. Method for monitoring the surfaces of slag and molten metal in a mould, tundish or ladle of a continuous casting apparatus, comprising directing a beam of electromagnetic waves emitted from radar equipment towards the surfaces of the slag and molten metal in the mould, tundish or ladle, wherein the beam emitted from the radar equipment has a bandwidth of at least 20 GHz.

2. Method according to claim 1, wherein the radar equipment emits a beam of electromagnetic waves having a bandwidth of at least 30 GHz.

3. Method according to claim 1, wherein the beam forms a frequency modulated continuous wave or quasi-stepped frequency modulated wave.

4. Method according to claim 1, wherein the radar equipment has been positioned to the side of the mould, tundish or ladle and the beam of electromagnetic waves is directed towards the slag and molten metal in the mould, tundish or ladle using a deflection device.

5. Method according to claim 4, wherein the electromagnetic waves travel over a distance between the radar equipment and the steel surface from 0.5 to 5 meter.

6. Method according to claim 1, wherein the radar equipment uses a leaky lens antenna for emitting the beam of electromagnetic waves.

7. Method according to claim 6, wherein the beam of electromagnetic waves is focused using a lens.

8. Method according to claim 7, wherein the lens focuses the beam of electromagnetic waves to a spot having a diameter of 3 to 5 cm on the metal surface.

9. Method according to claim 8, wherein the spot is moved over the metal surface to form an image of the shape of the metal surface.

10. Method according to claim 9, wherein the spot is moved over the metal surface using a rotation of a deflection device.

11. Method according to claim 9, wherein the spot is moved over the metal surface to scan the metal surface and form a number of images of the metal surface per second.

12. Method according to claim 11, wherein the moving spot is also used to scan the surface of the slag layer and to measure the thickness of the slag layer.

13. Method according to claim 9, wherein the spot is also used to form an image of the slag layer and to measure the thickness of the slag layer.

14. Method according to claim 8, wherein using the beam of electromagnetic waves a number of measurements of the level of the molten metal per second is performed.

15. Method according to claim 7, wherein using the beam of electromagnetic waves a number of measurements of the level of the molten metal per second is performed.

16. Method according to claim 1, wherein the radar equipment uses a leaky lens antenna having an opening angle of 30 degrees or less for emitting the beam of electromagnetic waves.

17. Method according to claim 1, wherein the radar equipment has been positioned to the side of the mould, tundish or ladle and a mirror directs the beam of electromagnetic waves towards the slag and molten metal in the mould, tundish or ladle.

18. Method according to claim 1, wherein the radar equipment has been positioned to the side of the mould, tundish or ladle and a mirror directs the beam of electromagnetic waves downwardly toward the slag an molten metal in the mould, tundish or ladle.

19. Method according to claim 1, wherein the slag is supplied as slag powder.

20. Method according to claim 1, wherein there is no cover over the mould, tundish or ladle.

21. Apparatus for monitoring the surfaces of slag and molten metal in a mould, tundish or ladle of a continuous casting apparatus, comprising:
   radar equipment for emitting a beam of electromagnetic waves having a bandwidth of at least 20 GHz towards the surfaces of slag and molten metal in the mould, tundish or ladle.

22. Apparatus according to claim 21, wherein the beam has a bandwidth of 30 GHz.

23. Apparatus according to claim 21 wherein a deflection device is part of the apparatus to direct the beam towards the slag and molten metal in the mould, tundish or ladle.

24. Apparatus according to claim 21, wherein the radar equipment uses a leaky lens antenna.

25. Apparatus according to claim 24, wherein a lens is placed before the leaky lens antenna to focus the beam to a spot on the surface of the molten metal.

26. Apparatus according to claim 25, wherein the lens has been chosen to focus the beam over a distance of from 0.5 to 5 m.

27. Apparatus according to claim 26, wherein a rotatable deflection device is placed after the lens to be able to move the spot over the metal surface.

28. Apparatus according to claim 21, comprising the mould, tundish or ladle.

29. Method for monitoring the surfaces of slag and molten metal in a mould, tundish or ladle of a continuous casting apparatus, comprising directing a beam of electromagnetic waves emitted from radar equipment using a leaky lens antenna towards the surfaces of the slag and molten metal in the mould, tundish or ladle, wherein the beam emitted from the radar equipment has a bandwidth of at least 30 GHz, wherein
- the beam forms a frequency modulated continuous wave or quasi-stepped frequency modulated wave,
- the radar equipment has been positioned to the side of the mould, tundish or ladle and the beam of electromagnetic waves is directed towards the slag and molten metal in the mould, tundish or ladle using a deflection device,
- the slag is supplied as a slag powder, and
- there is no cover over the mould, tundish or ladle.

* * * * *